UNITED STATES PATENT OFFICE.

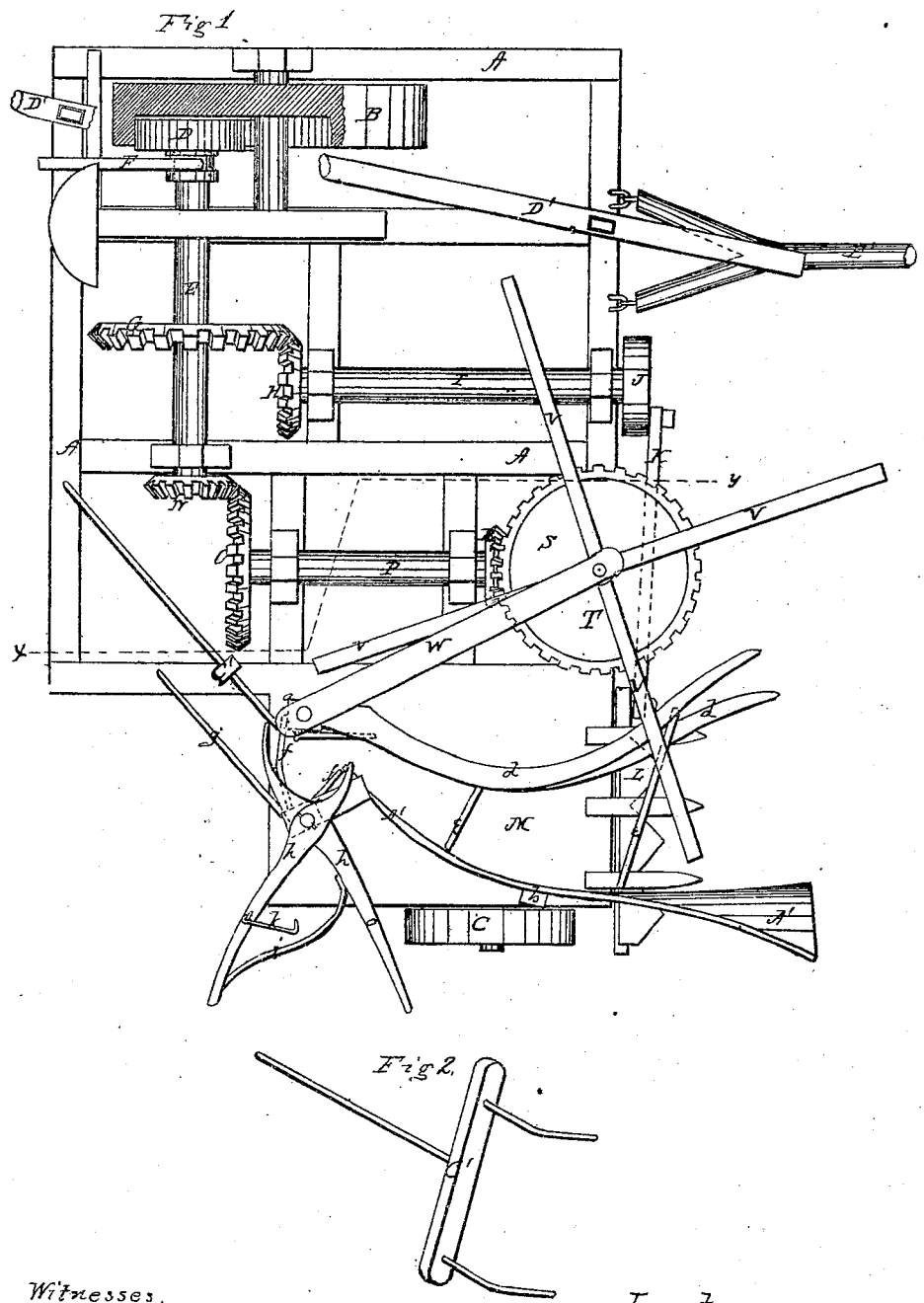

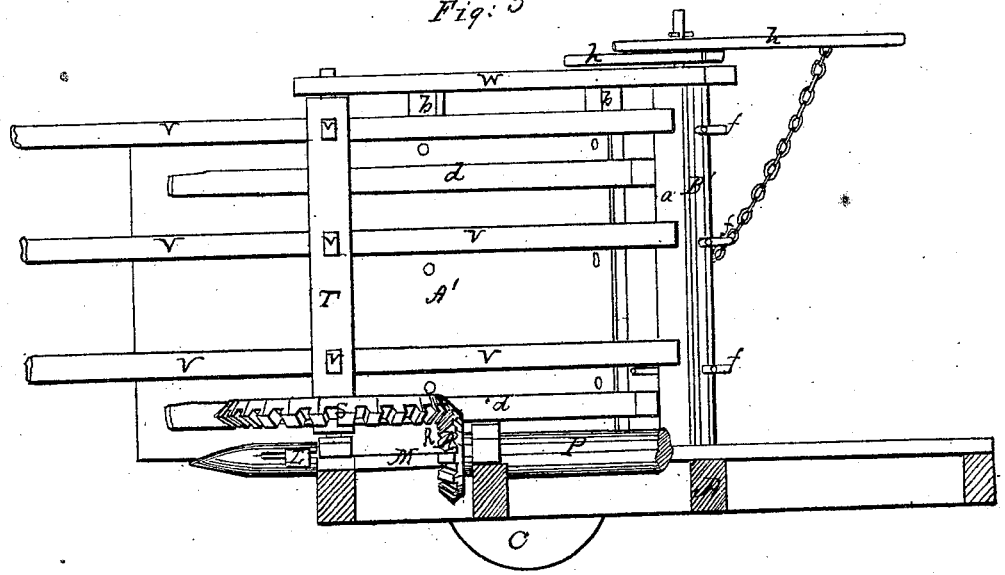

WILLIAM H. KARICOFE, OF HARRISONBURG, VIRGINIA.

Letters Patent No. 93,311, dated August 3, 1869.

CORN-HARVESTER AND SHOCKER.

The Schedule referred to in these Letters Patent and making part of the same.

*To all whom it may concern:*

Be it known that I, WILLIAM H. KARICOFE, of Harrisonburg, in the county of Rockingham, and in the State of Virginia, have invented certain new and useful Improvements in Corn-Harvester and Shocker; and do hereby declare that the following is a full, clear, and exact description thereof, reference being had to the accompanying drawings, and to the letters of reference marked thereon, making a part of this specification.

The nature of my invention consists in the construction and general arrangement of a machine for cutting corn and collecting it into shocks, when it is tied together and dropped at any point desired.

In order to enable others skilled in the art to which my invention appertains to make and use the same, I will now proceed to describe its construction and operation, referring to the annexed drawings, in which—

Figure 1 is a plan view of the whole machine.

Figure 2 is a perspective of the "stacker" used by the operator of the machine, to assist in shocking the corn, if necessary.

Figure 3 is a side section of the machine through the line $x$–$y$, fig. 1.

A represents the frame of the machine, supported at one side by the driving-wheel B, and at the other by a smaller wheel, C. The large driving-wheel B is, on its inner side, along its periphery, provided with a projecting rim, cogged on the inside.

A collar, D, placed on the end of the shaft E, gears with the cogs on the driving-wheel, and thus, when the machine is in operation, motion is communicated to the shaft E. The collar D being, however, movable on said shaft, it can be thrown out of gear by means of the lever F, and, consequently, the working of the machine stopped, although the team is moving on.

On the shaft B is placed a mitre-wheel, G, which gears with a similar wheel, H, on the shaft I, said shaft being, at its front end, provided with a crank-wheel, J, and this crank-wheel is, by a pitman, K, connected with the cutter-bar L, so that by this means the necessary reciprocating motion is communicated to the cutter-bar.

The cutter-bar L, with its finger-bar, is constructed in any of the known and usual ways, and placed at the front edge of the platform M, so that when the corn is cut it will be brought, by means hereinafter to be set forth, in an upright position on this platform.

On the inner end of the shaft E is another mitre-wheel N, which gears with a similar wheel, O, on the shaft P.

This shaft is provided, at its front end, with another mitre-wheel, R, which gears with a similar wheel, S, near the lower end of a vertical shaft, T, placed at the front side of the frame A, and near the inner side of the platform M.

The vertical shaft T, which is provided with arms V V, has its bearings, the lower end in a suitable journal-box on the frame A, and the upper end in the front end of a horizontal bar, W, which extends from the upper end of a standard, $a$, placed at the inner rear edge of the platform M.

On the platform M is placed an upright board, or guide, A', the front end of which extends beyond the outer front end of the platform, and the upper end of said guide is bent outward in front of the platform, as seen in fig. 1.

On the platform, the board, or guide A' is curved inward, so that its inner rear edge shall be a suitable distance in front and to the outside of the standard $a$.

This guide is supported by suitable standards $b\ b$, secured to the platform.

From the standard $a$ extend forward two or more curved arms, $d\ d$, the front ends of which extend beyond the cutter-bar at its inner end, thus forming, with the guide A', a channel for the corn to pass toward the rear.

When the machine is in motion, the vertical shaft T obtains a rotary motion, so that as the corn is being cut, its arms V V will carry the corn backward between the curved arms $d\ d$ and the guide A'.

From each of the arms $d$, a spring, $e$, extends to the guide, which springs prevent the corn from falling down, but hold it up, and at the same time yield sufficient to allow the passage of the corn when pressed upon by the arms V V.

At the rear edge of the platform M, is placed a beam, B', which, at both ends, is provided with journals, the journal at the lower end being placed in the platform, and the one at the upper end in an arm extending from the rear standard $b$, so that the said beam B' may be turned in either direction at will.

From the beam B' extend two rows of arms, $f\ f$, which, when turned inward, so to say, close the opening between the standard $a$ and the rear edge of the guide A'.

The corn is thus carried by the arms V V in between the two rows of arms, $f\ f$.

On the upper journal of the beam B' are placed two crooked levers, $h\ h$, acting as a pair of pincers, which are then closed, holding the shock of corn firmly together.

By means of an arm, $g$, extending from the beam, the beam, with the shock of corn, is turned outward when it is tied up, and when the levers are released, the shock of corn drops down. The beam B' is then turned inward again to receive the next shock.

The two levers, $h\ h$, are held apart by a spring, $i$, and when closed may be held by a hook and eye, $k$, as seen in fig. 1.

To assist the shocking of the corn, between the arms $f\ f$, the operator may use the "stacker" $C'$, consisting merely of a head, with a series of crooked teeth and a handle, as represented in fig. 2.

The front end of the machine may be raised or lowered at will, by means of a lever, $D'$, the front end of which is attached to the tongue $E'$, then passes backward, pivoted to a standard on the frame $A$, and the rear end sliding up and down on another standard or guide, so that by raising or lowering the rear end of the lever $D'$, the front side of the machine is raised or lowered at will, thus allowing the operator to cut the corn at any height from the ground that he may desire.

Having thus fully described my invention,

What I claim as new, and desire to secure by Letters Patent, is—

1. The "stacker" $C'$, constructed substantially as shown and described, and for the purposes set forth.

2. The rotating beam $B'$, provided with two rows of arms, $f\ f$, and a handle, or arm, $g$, substantially as and for the purposes herein set forth.

3. The crooked levers $h\ h$, spring $i$, and hook $k$, or their equivalents, constructed substantially as described, and for the purposes set forth.

4. The rotating beam $B'$, provided with two rows of arms, $f\ f$, handle or arm $g$, and crooked levers $h\ h$, all constructed and arranged to operate substantially as and for the purposes herein set forth.

5. The combination of the crooked arms $d\ d$, guide-board $A'$, rotating beam $B'$, arms $f\ f$, and levers $h\ h$, all constructed as described, and arranged to operate substantially as and for the purposes herein set forth.

6. The arrangement of the platform $M$, reel $T\ V$, arms $d\ d$, guide-board $A'$, rotating beam $B'$, arms $f\ f$, and levers $h\ h$, all constructed and operating substantially as and for the purposes herein set forth.

In testimony that I claim the foregoing, I have hereunto set my hand, this 9th day of June, 1869.

WM. H. KARICOFE.

Witnesses:
J. M. STOOP,
J. S. SPECKS.